United States Patent
Tanaka (10) Patent No.: US 7,204,649 B2
(45) Date of Patent: Apr. 17, 2007

(54) OPTICAL COMPONENT WITH HOLDER AND MANUFACTURING METHOD THEREOF

(75) Inventor: Hiroyuki Tanaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 198 days.

(21) Appl. No.: 11/038,530

(22) Filed: Jan. 21, 2005

(65) Prior Publication Data

US 2005/0162758 A1 Jul. 28, 2005

(30) Foreign Application Priority Data

Jan. 22, 2004 (JP) ............................ P2004-014714

(51) Int. Cl.
 *G02B 6/36* (2006.01)
 *C03B 11/00* (2006.01)
(52) U.S. Cl. ............................ 385/93; 385/92; 385/33; 385/136; 385/137; 65/357; 65/361
(58) Field of Classification Search ................. 385/31, 385/33, 34, 93, 92, 134, 135, 136, 137; 359/811; 65/357, 358, 361, 374.1, 374.11
See application file for complete search history.

(56) References Cited

U.S. PATENT DOCUMENTS

| | | | |
|---|---|---|---|
| 4,685,948 A | * | 8/1987 | Kuribayashi et al. .......... 65/26 |
| 5,333,224 A | * | 7/1994 | Kikuchi ........................ 385/93 |
| 5,378,255 A | * | 1/1995 | Ito ................................. 65/64 |
| 6,504,975 B1 | * | 1/2003 | Yamagata et al. ............. 385/33 |
| 2004/0174618 A1 | * | 9/2004 | Kikuchi ....................... 359/811 |
| 2005/0162758 A1 | * | 7/2005 | Tanaka ........................ 359/811 |

FOREIGN PATENT DOCUMENTS

| | | | | |
|---|---|---|---|---|
| JP | 03-237408 | 10/1991 | | 385/92 X |
| JP | 03-265529 | 11/1991 | | 385/92 X |

* cited by examiner

*Primary Examiner*—Brian M. Healy
(74) *Attorney, Agent, or Firm*—Whitham Curtis Christofferson & Cook, PC (57) ABSTRACT

As means of the present invention, first, on the optical element, a plate-like peripheral edge part which is protruding, while surrounding an effective part having an optical function thereof, outside from the effective part is provided. Furthermore, at a part of the through hole of the holder, a straight cylindrical part is provided. Then, an outer circumference of the peripheral edge part is tightly fitted to an inner circumferential surface of the cylindrical part of the through hole throughout the entire circumference.

13 Claims, 8 Drawing Sheets

OPTICAL COMPONENT WITH HOLDER AND MANUFACTURING METHOD THEREOF

BACKGROUND OF THE INVENTION

1. Field of the Invention

The present invention relates to an optical component with a holder provided by fixing an optical element used in a technical field of optical communications, optical information reading and the like to a holder, and in particular, it relates to an optical component with a holder manufactured by a molding method.

2. Related Art

Although it is widely known that lenses are used in a technical field of optical communications, optical information reading and the like, most of these lenses are generally used while being previously fixed to lens holders. Although these lens fixing methods are variously provided, in particular, known is a technique of press-fitting a raw-material glass to the inside of a metallic lens holder while simultaneously molding the same in a spherical or aspherical form and integrating the lens and holder (see Japanese Patent Publication No. JP H03-265529A or, Japanese Patent Publication No. JP H03-237408A for example).

This method is far more simple than applying a metal film to the outer circumference of a single-piece lens and fixing the same to a holder by a metal solder or attaching a single-piece lens and a holder by sealing with a low-melting point glass or the like, and a low-cost highly accurate fixation between the lens and holder can be realized.

In this technique disclosed in JP H03-265529A, a projecting portion is provided on the inner circumferential surface of a through hole of a lens holder, a globular glass raw material is supported on this projecting portion, and in that condition, this glass raw material is heated and molded. Simultaneously, the glass is press-fitted to the inner circumferential surface including the projecting portion, whereby a formation of lens surface shapes by molding and a fixation to the holder are achieved.

Also, in JP H03-237408A, employed is a technique of providing a retaining portion in place of a projecting portion, supporting a plate-like glass raw material on this retaining portion, and similar to the case of Japanese Patent Publication No. JP H03-265529A, simultaneously with a surface formation by molding, press-fitting a lens to the inner circumferential surface of the holder and a step portion between the inner circumferential surface and retaining portion.

However, in the method and structure, an uneven internal stress is produced inside the lens finished by molding by a steep point of the projecting portion of the inner circumferential surface of the lens holder. When an internal stress is being produced inside a transmission optical component such as a lens, polarization properties therefore become uneven, and it cannot be used particularly for a module wherein polarization retention is required.

In addition, as a result of forming the projecting portion, during molding, a part of the glass raw material protrudes outside the molds and can cause chipping. However, this uneven protrusion which can cause defects such as chipping is, according to Japanese Patent Publication No JP 2002-6819A, eliminated by forming an annular projection different from the above-described projecting portion on the inner circumferential surface in the vicinity of an opening portion of the lens holder. However, the shape of the lens holder is complicated, and the processing cost is increased. Moreover, it is necessary to deform the annular projection by an upper metal die for molding, and it is technically very difficult to deform a part of a metal component by an expensive metal mold which is made mainly of a brittle material or ceramic.

On the other hand, in JP H03-237408A as well, a point is formed at the step portion between the retaining portion and inner surface, an uneven internal stress is similarly produced, and this may cause chipping at an edge part of the lens.

In addition, in the above-described related arts, it is necessary to match the lens holder with the glass raw material in thermal expansion coefficients (in the above-described documents, the thermal expansion coefficient of the lens holder has been made slightly greater than that of the glass raw material). Although a matching in the thermal expansion coefficients is certainly important, in parallel therewith, a matching of volume in the lens holder with the volume of the glass raw material is also important. However, if a projection and a complicated structure exist on the inner circumferential surface of the lens holder, a problem also exists such that this matching in volume is not easily achieved.

SUMMARY OF THE INVENTION

The present invention has been made to solve the problems of the related arts as described above, and an object is to provide an optical component with a holder and a manufacturing method thereof wherein occurrence of an uneven internal stress is small during molding and occurrence of chipping is also small.

An object of the present invention is an optical component with a holder in which an optical element provided by molding glass has been fixed inside a through hole of a holder. As means of the present invention, first, on the optical element to be fixed, a plate-like peripheral edge part which is protruding, while surrounding an effective part having an optical function thereof, outside from the effective part is provided. Furthermore, at a part of the through hole of the holder, a straight cylindrical part whose sectional shape is unchanged in axial direction is provided. Then, an outer circumference of the peripheral edge part is tightly fitted to an inner circumferential surface of the cylindrical part of the through hole throughout the entire circumference.

By press-fitting an optical element to the cylindrical inner circumferential surface of the holder, occurrence of an uneven internal stress can be prevented inside the optical element, occurrence of chipping or the like is prevented, and the problem in polarization properties can also be surmounted. In addition, by press-fitting the optical element throughout the entire circumference of the inner circumferential surface of the through hole of the holder, airtightness is secured between the holder and optical element.

In addition, it is desirable that, in a direction perpendicular to the optical axis of the optical element, a sectional shape of the effective part of the optical element and a sectional shape of the outer circumference of the peripheral edge part are both made circular, and where diameters thereof are De and D, respectively, a difference between D and De is made 0.3 mm or more.

By satisfying the above condition, the effective part of the circular optical element such as a lens can be stably molded.

Furthermore, it is desirable that a ratio A/D of a thickness A in the optical axis direction of the peripheral edge part to the diameter D of the outer circumference of the same part is made 0.25 or more, and a ratio A/Th of the thickness A to a maximum thickness Th of the optical element is made 0.5 or more.

In addition, the peripheral edge part of the optical element has surfaces composed of planes perpendicular to the optical axis and an outer circumferential surface parallel to the optical axis, and it is desirable that corner portions where the surfaces composed of planes are intersected with the outer circumferential surface are processed to be rounded corners, and a radius of curvature R (unit: mm) thereof is made, where a thickness in the optical axis direction of the peripheral edge part is A (mm), in a range of $$0.1 \leq R \leq (A-0.25)/2$$

Alternatively, it is also possible that a radius of curvature R (unit: mm) thereof is made, where diameters of the effective part of the optical element and outer circumference of the peripheral edge part are De and D (whose units are both mm), respectively, in a range of $$0.1 \leq R \leq (D-De)/2 - 0.025$$

By providing trims at the outer circumference of the peripheral edge part of the optical element to be press-fitted to the holder with the above-described conditions, occurrence of chipping or the like at the edge part of the optical element can be effectively prevented.

In addition, a linear expansion coefficient of the holder is made greater than a linear expansion coefficient of a glass raw material of an optical component, and a difference therebetween is made $20 \times 10^{-7}/°$ C. or less. Thereby, in respect to heating and cooling in a molding process, it can be avoided that an excessively great stress is applied to the optical element and tight fitting becomes insufficient on the contrary.

The optical element is provided as a lens, in particular, an aspherical convex lens. Thereby, a holder-integrated lens having a structure wherein the lens has been press-fitted to the inner circumferential surface of a cylindrical straight hole part of the holder.

In conjunction with the through hole of the holder to which this lens has been fixed, a cylindrical part in which a semiconductor optical element is to be inserted and fixed is provided, the semiconductor optical element is airtightly sealed in this cylindrical part. And a distance between the lens and semiconductor optical element is determined so that light emitted by the semiconductor optical element is condensed or collimated or light received by this semiconductor optical element is condensed or collimated.

Thereby, an optical component wherein a semiconductor optical element of various types and a lens have been combined can be provided.

As a method for manufacturing an optical component with a holder, the present invention employs the following means.

Into a holder provided with a through hole having a straight cylindrical part whose sectional shape is unchanged at least partly in axial direction, a pair of molds are inserted so as to be opposed from both sides of this through hole, a glass raw material is press-molded in a formed space. Thereby an optical element having a plate-like peripheral edge part which is protruding, while surrounding an effective part having an optical function, outside from this effective part is formed, and an outer circumference of this peripheral edge part is tightly fitted to an inner circumferential surface of the cylindrical part of the through hole of the holder throughout the entire circumference.

By such a method, by, simultaneously with forming an optical element, press-fitting the optical element to the cylindrical inner circumferential surface of the holder, occurrence of an uneven internal stress can be prevented inside the optical element, and occurrence of chipping or the like can be prevented. In addition, by press-fitting the optical element throughout the entire circumference of the inner circumferential surface of the through hole of the holder, airtightness is secured between the holder and optical element.

At this time, by providing molding surfaces of the molds with such shapes as parts which do not contact the holder or molds exist in the peripheral edge part of the optical element molded at a point in time where press-molding is finished, and for a variation in the inside diameter of the cylindrical part of the through hole of the holder, by changing shapes of the parts of the edge part of the optical element which do not contact the holder or molds within a predetermined range, the volume of a charging glass raw material is maintained at a constant amount.

In particular, the parts of the peripheral edge part which do not contact the holder or molds are rounded corner parts of corner portions where surfaces composed of planes and an outer circumferential surface of the peripheral edge part are intersected, and radius of curvature thereof is changed.

The volume of the glass raw material to be charged during molding of an optical element can cause, if this is in appropriate, occurrence of an excessively great stress, molding failure, or failure in adhesion with the holder. Although the shapes of parts having the lens surfaces cannot be changed, if parts which do not contact the holder or molds are left in the peripheral edge part, since these parts can be changed in shapes to some extent, by utilizing these parts, occurrence of such problems as described above can be avoided while the volume of the charging glass raw material is maintained at a constant amount.

Also, similarly in the method for manufacturing an optical component with a holder, it is desirable that the holder is maintained at a predetermined position with respect to either of the molds by a first mechanical means, and a distance between both molds when pressing is finished is determined at a predetermined value by a second mechanical means.

By such mechanical means, the position of the optical element after molding in terms of inside the holder can be accurately determined without using an electronic control means or the like.

By the present invention as in the above, by appropriately selecting a glass raw material and a holder material based on a relationship of linear expansion coefficients and also appropriately setting the volume of the glass raw material according to the shape of the press-fitting inner circumferential surface and accuracy thereof, an optical component with a holder which has less remaining internal stress, therefore whose polarization properties are excellent, in which chipping or cracks are hardly produced at the edge part of the optical element, and which is excellent in airtightness can be provided. Furthermore, by combining these with a semiconductor optical element, it is also possible to provide a small-sized optical component excellent in reliability.

BRIEF DESCRIPTION OF THE PREFERRED EMBODIMENTS

DETAILED DESCRIPTION OF THE PREFERRED EMBODIMENTS

As a most preferred embodiment of an optical component with a holder of the present invention, hereinafter, description will be given of a glass molded aspherical lens fixed to a metallic lens holder. However, the embodiment of the present invention is not limited hereto. In addition to various types of lenses, the present invention can be broadly applied to optical components with holders wherein various types of optical elements which can be manufactured by molding, such as curved reflecting mirrors and prisms, are used while fixing the same to holders having through holes.

(Lens Shape Design)

Figure 1:
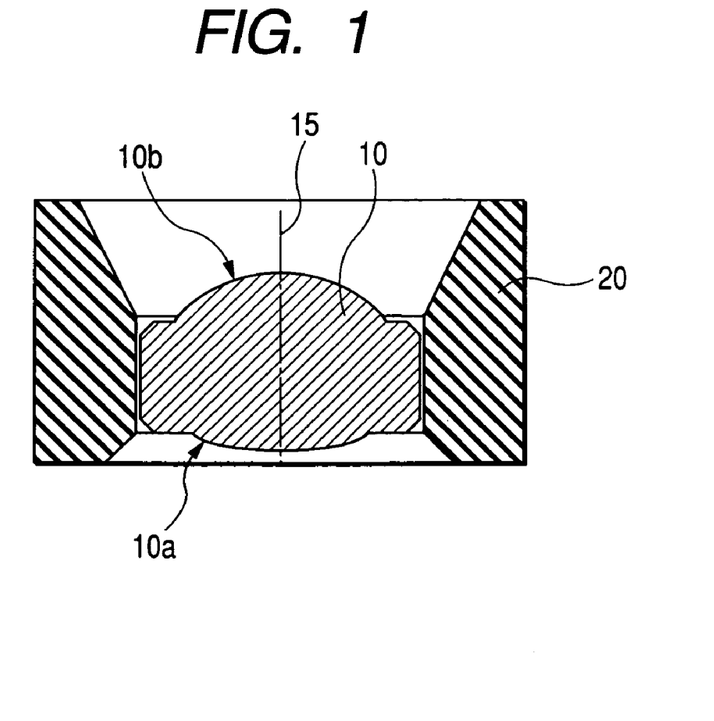
FIG. 1 is a sectional view of a molded lens with a lens holder, which is an embodiment of the present invention.
Figure 2:
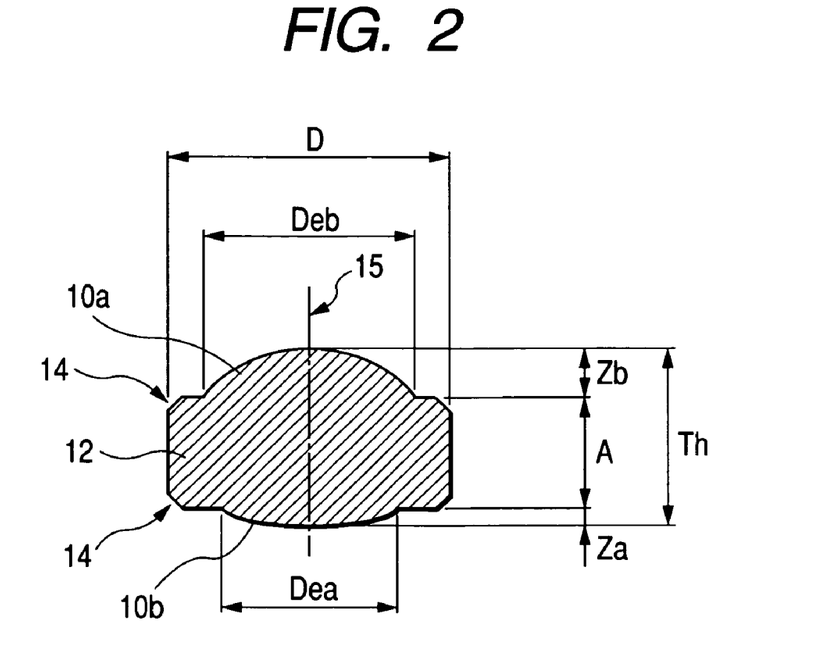
FIG. 2 is a sectional view of a molded lens of the present invention.
Figure 3A:
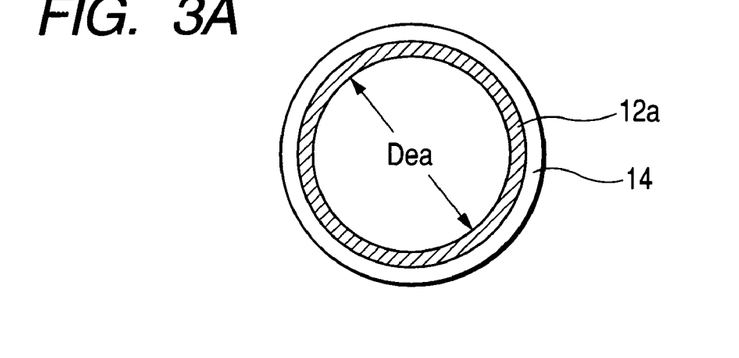
FIGS. 3A and 3B are outline views of a molded lens of the present invention.
Figure 3B:
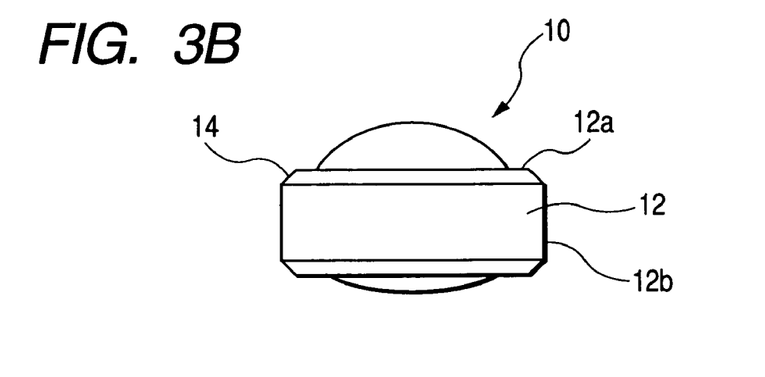
Figure 4:
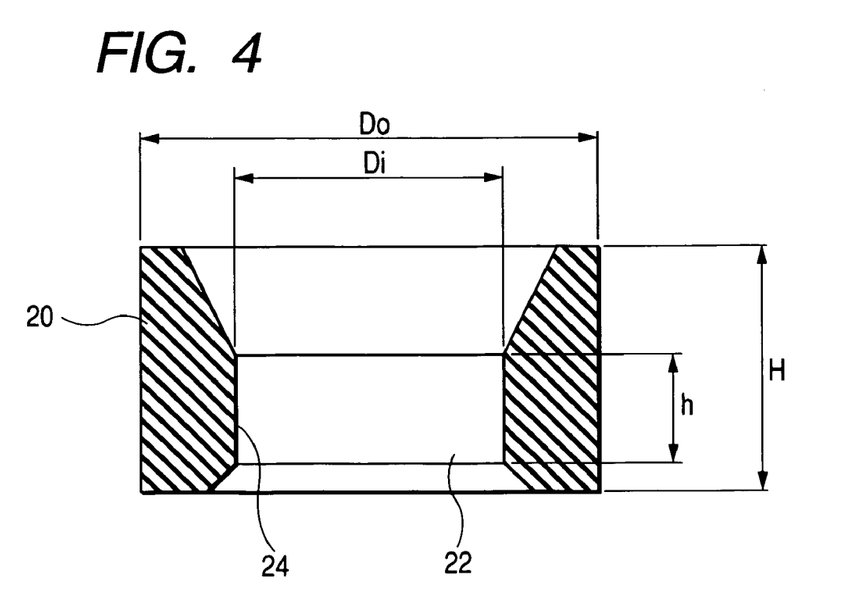
FIG. 4 is a sectional view of a lens holder of the present invention.

FIG. 1 is a sectional view of an aspherical lens 10 fixed to a metallic lens holder 20 of the present invention, including an optical axis 15 of the lens. FIG. 2 is a sectional view of only the aspherical lens 10, similarly, including the optical axis 15 of the lens, and FIGS. 3A and 3B are outline views of the aspherical lens. In addition, FIG. 4 is a sectional view of the metallic lens holder 20.

As an external form of the lens, a section in a direction perpendicular to the optical axis 15 is circular, and surface shapes to be refracting surfaces (lens surface) of light rays are optimally designed by optical design software according to a purpose of use. Thereby, shapes of lens surfaces 10a and 10b, a lens thickness Th, a lens diameter D, effective diameters Dea and Deb of the lens, sag amounts Za and Zb, etc., can be calculated. To which part dimensions of the lens these physical amounts correspond to is as shown in FIG. 2.

Herein, the effective diameter of the lens means a diameter of an effective part where the lens has a lens effect of its optical function when a light ray passes through this lens. In a case, as in the present example, where a lens which is different in refractive power between both lens surfaces is disposed, the effective diameter also generally has different values between both lens surfaces. This effective diameter can also be considered as a region deformed into a desirable shape by molding.

An experimental investigation by the inventor has discovered that it is desirable that the effective diameter De satisfies the following relationship of expression (1) with respect to a lens diameter D. Here, De is a greater value of Dea and Deb.

$$De \text{ (mm)} \leq D \text{ (mm)} - 0.3 \tag{1}$$

For this lens, a part called an edge 12 which plays a function of, so to speak, a lens frame is provided. The edge 12 is a plate-like part provided outside the effective diameter part so as to surround the lens, and this has a fixed thickness. As shown in FIG. 3A, the lens has a plane part 12a outside the lens surface and has an outermost circumferential surface 12b of the lens vertically intersecting with this surface. An adhesion, fixation or the like to a holder after lens formation is carried out via this edge 12. Namely, the outer circumferential surface 12b of the edge 12 is fixed in a manner tightly fitted to an inner circumferential surface 24 of a through hole 22 of the lens holder 20 shown in FIG. 4 and reaches a mode as shown in FIG. 1. In addition, when the lens is solely handled, by grasping this peripheral edge part 12, it is possible to prevent occurrence of inconveniences such as dirt and scratches on the lens surfaces.

Figure 5:
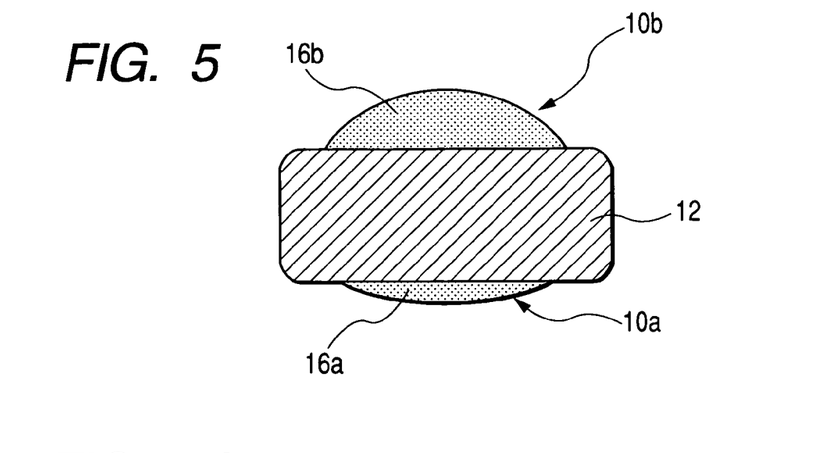
FIG. 5 is a view for explaining lens parts.

The lens shown in FIG. 2 or FIGS. 3A and 3B is fabricated by integrally molding a homogeneous glass raw material, and in terms of the shape, this is divided into two parts 16a and 16b having the lens surfaces and a part of the edge 12 as shown in FIG. 5. The parts 16a and 16b including the lens surfaces 10a and 10b are solid bodies having such shapes as a part of an approximately globular body (which is not an accurate globular body since the lens surfaces are aspherical) were cut away, and the edge 12 has a discoid form and whose outer circumferential corner portions have rounded corner forms. These rounded corner portions are called trims 14.

Since the outer circumferential surface 12b of the edge 12 is a part to be press-fitted to the inner circumferential surface 24 of the lens holder and whereby supporting the lens, it is preferable to set its thickness A and a radius of curvature of the trims 14 to ranges of the following expressions so that the lens can be regarded as a stable rigid body. By carrying out a basic lens shape design by use of calculated values of these, a molded lens as being a stable rigid body can be fabricated.

It has been experimentally discovered that where $$A/D \geq 0.25 \tag{2}$$

and the lens thickness is Th(mm), the thickness A(mm) of the edge 12 is desirably determined so as to satisfy:

$$A/Th \geq 0.5 \tag{3}$$

In addition, it is desirable to set a radius of curvature R(mm) of the trims 14 to a range of:

$$0.1 \leq R \leq (A-0.25)/2 \tag{4}$$

in relation to the edge thickness A, and in relation to a lens diameter D and an effective diameter De, to a range of:

$$0.1 \leq R \leq (D-De)/2 - 0.025 \tag{5}$$

It is most desirable to determine R so as to satisfy the narrower range of either expression (4) or (5).

If fabrication of a molded lens is intended by a dimensional setting which does not meet these basic lens shape conditions, press-fitting intensity is resultantly lowered, and inconveniences such as a dropout and cracks may be involved.

The lens holder 20 to hold a lens of the above-described shape has a basic shape as shown in FIG. 4. A through hole 22 for inserting and fitting a lens is provided in the main body of the lens holder 20. A lens is fixed so that a direction (overall length H) of this through hole is coincident with an optical axis direction of the lens. In this through hole, for the inner circumferential part 24 to be tightly fitted to a lens edge, a part of a circular cylindrical form whose sectional shape has an invariable diameter Di regardless of the position is provided. It is preferable that parts other than this cylindrical part, that is, parts close to the surface of the holder are provided in a tapered form, since a glass raw material can be easily charged before molding. However, providing no projected part or the like inside the through hole is one of the features of the present invention.

For press-fitting a molded lens to the inner circumferential surface 24 of the lens holder for integration, it is necessary that a relationship between the lens volume and lens holder capacity is appropriate. If the amount of a charging glass raw material is excessive, a protrusion or the like occurs during molding and can cause lens chipping or the like. On the other hand, if the amount of the glass raw material is deficient, adhesion between the lens and holder becomes insufficient.

Meanwhile, the diameter of the through hole of the lens holder has a processing tolerance, and a certain degree of unevenness occurs in the capacity of the holder. Although the volume of the glass raw material can be adjusted by the weight, it is impossible to adjust the same according to a variation in the capacity of the holder. Hereinafter, description will be given of a method for maintaining the volume of the charging glass raw material at a constant amount even when unevenness in the capacity of the holder exists.

In order to suppress unevenness in optical characteristics of lenses of one type, volume errors of the parts 16a and 16b including the lens surfaces 10a and 10b must be made extremely small. Accordingly, the volume of these parts 16a and 16b has no adjusting margin.

Figure 6A:
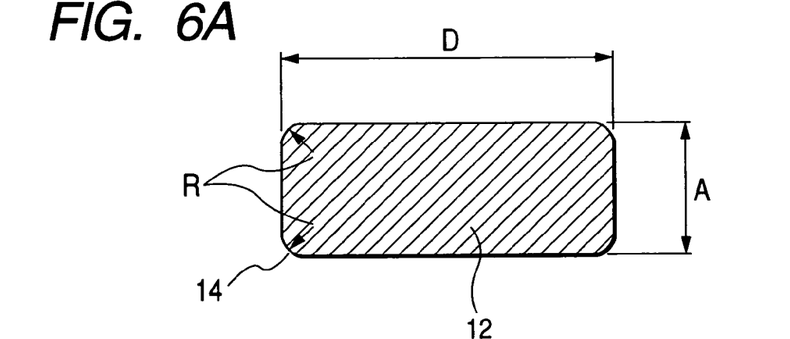
FIGS. 6A, 6B and 6C are sectional views showing shapes of an peripheral edge part of a lens.
Figure 6B:
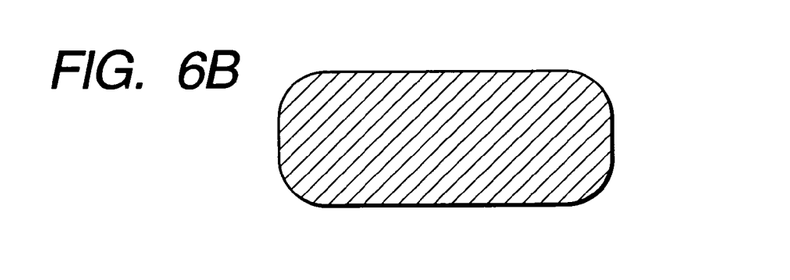
Figure 6C:
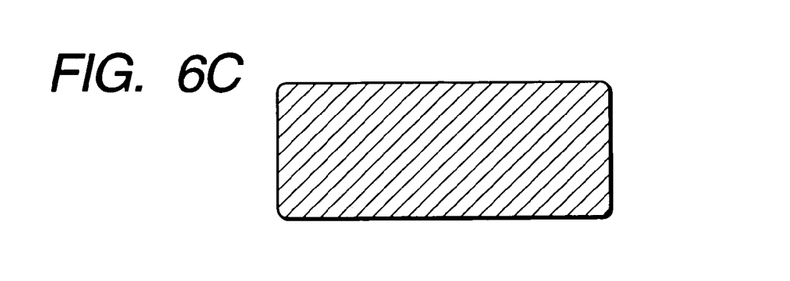

On the other hand, for the volume of the edge 12 part, a fixed tolerance can be accepted. Schematic views of volume variations of the edge part 12 are shown in FIGS. 6A through 6C. As shown in FIGS. 6B and 6C, the volume of the edge part is changed depending on the size of the radius of curvature R of the trims 14, since a change within a fixed range of this part does not exert a substantial influence on the optical characteristics of the lens or adhesion to the holder, a slight volume error can be absorbed.

Namely, the lens volume is determined so that the radius of curvature R of the trims 14 is within the allowable range of expression (4) or (5). A lens of the present invention is manufactured by molding of a globular glass raw material as will be described later. Accordingly, the volumes of the lens after molding and glass raw material can be regarded to be equal if a contraction or the like of the material in the molding process is disregarded.

On the other hand, if a variation range of the inside diameter dimension of the inner circumferential surface of the through hole of a used lens holder is already known, a range of the volume of a lens after molding can be determined so that the molded lens can be press-fitted to the inner circumferential surface of the holder. In molding, by charging a glass raw material of volume within this range, the shapes of the lens surfaces and adhesion between the lens and lens holder are not changed even when the capacity of a through hole of the lens holder is varied.

More generally speaking, the molding surfaces of molds are provided with such shapes as parts which do not contact the holder or molds exist in an peripheral edge part of an optical element (lens) molded at the point in time where press-molding is finished. For a variation in the inside diameter of the cylindrical part of the through hole of the holder, by changing the shapes of the parts which do not contact the holder or molds of the peripheral edge part of the optical element within an allowable range, the volume of a charging glass raw material can be maintained at a constant amount.

However, this molding and press-fitting process to the holder is carried out at a temperature around a yielding point of glass to be a raw material. Accordingly, the glass raw material and holder material are changed in volume by their thermal expansion. Therefore, if an influence of thermal expansion is not taken into consideration when the volume of the glass raw material is adjusted as described above, inconveniences may occur such that, in a process of heating or cooling, the lens receives an excessively great stress from the holder and cracks and distortion or the like occur or the lens cannot be fixed to the holder on the contrary.

Concretely, owing to a difference in contraction between the glass raw material and holder which occurs mainly during cooling, if a linear expansion coefficient of the glass raw material is greater than that of the holder material, the former becomes greater in the degree of contraction than the latter, and the lens cannot sufficiently be press-fitted to the inner circumferential surface of the holder.

On the other hand, if a linear expansion coefficient of the glass raw material is excessively smaller than that of the holder, lens tightening by the holder during cooling becomes excessively great and an internal stress remains, a phenomenon of a decline in optical performance focusing on polarization properties of the lens occurs, and furthermore, cracks can occur inside or on the surface of the lens.

Accordingly, it becomes important to select raw materials for the lens and holder so that linear expansion coefficients of both maintain a fixed relationship, and this is concretely shown by the following expression.

$$0 < (\text{linear expansion coefficient of the lens holder} - \text{linear expansion coefficient of the glass raw material}) \leq 20 \times 10^{-7} / (^\circ C.) \quad (8)$$

In a concrete example, a glass raw material whose linear expansion coefficient was $102 \times 10^{-7}/^\circ$ C. was used as a molding material. As a holder material, ferritic stainless steel such as SF20T or SUS430 was used. Linear expansion coefficients are $110 \times 10^{-7}/^\circ$ C. and $114 \times 10^{-7}/^\circ$ C., respectively, which satisfy the above expression. Ferritic stainless steel is generally known as free-cutting steel, which is advantageous in machining.

(Lens Manufacturing Method)

Figure 7:
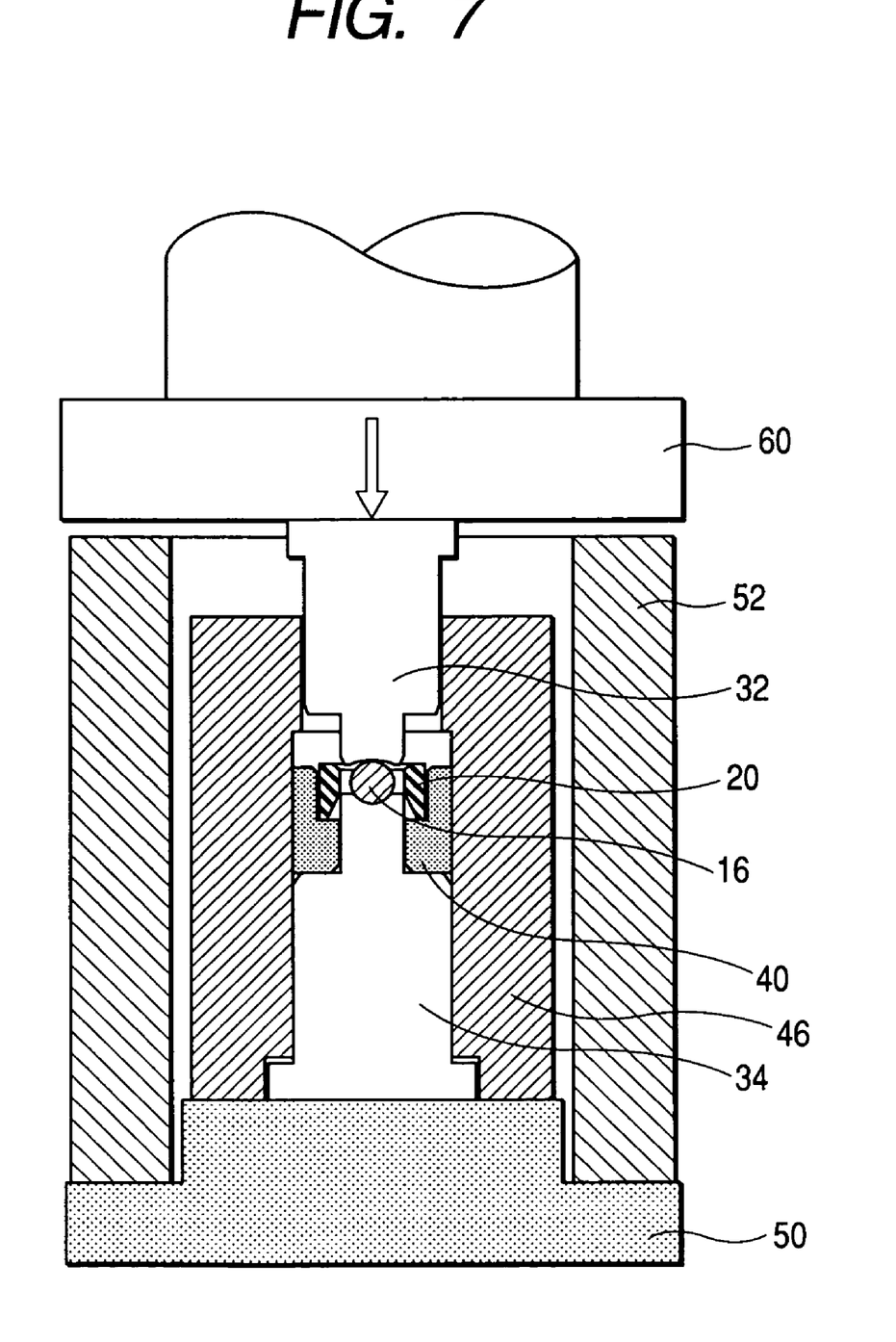
FIG. 7 is a schematic view of a device for manufacturing a molded lens with a lens holder of the present invention.
Figure 8:
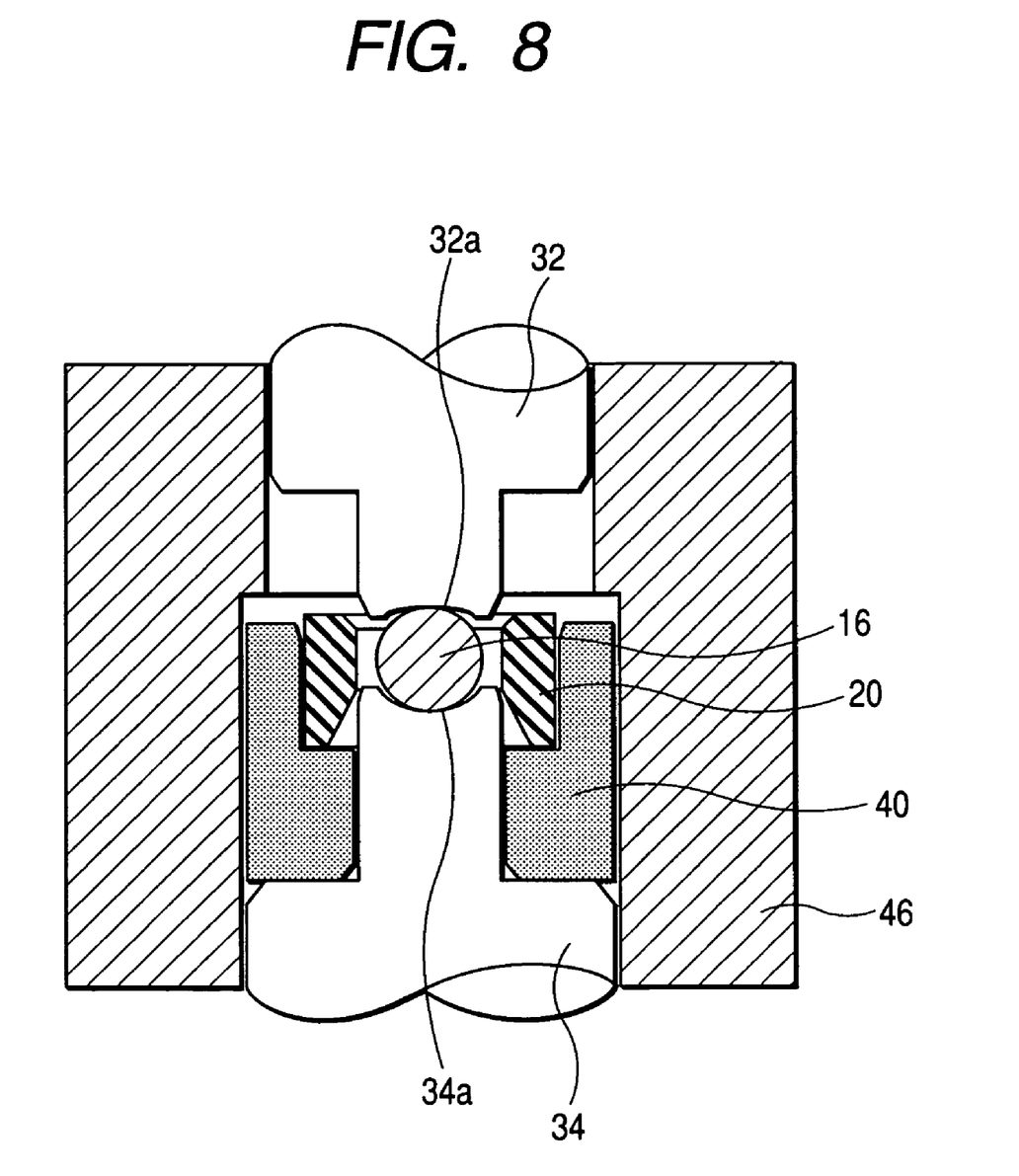
FIG. 8 is a schematic view of a center portion of a molding unit.
Figure 9:
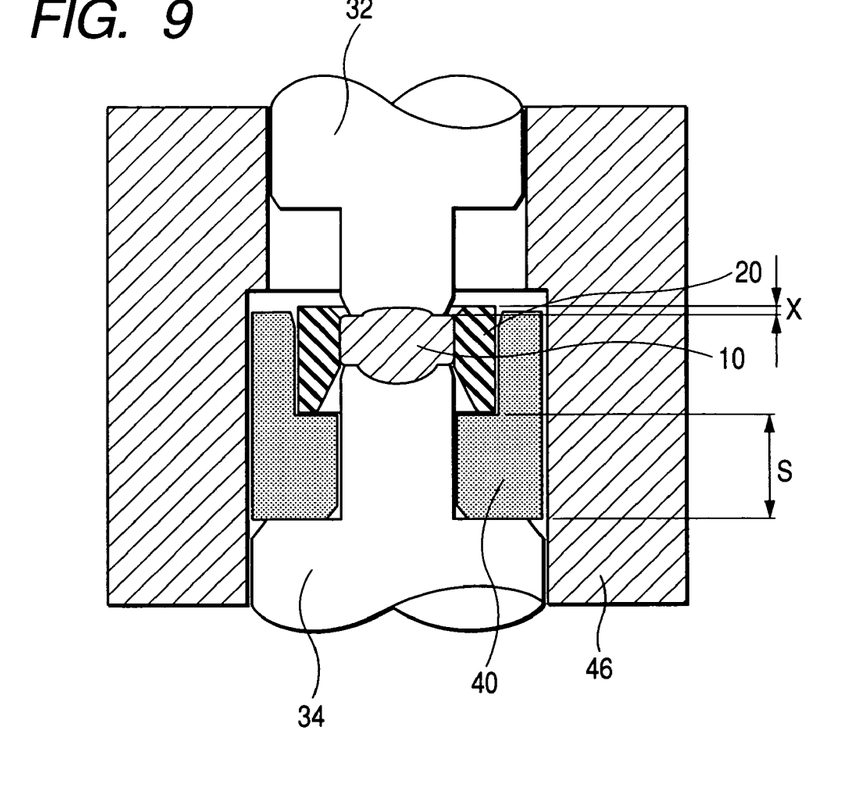
FIG. 9 is a view showing a condition after completion of molding.

Schematic views of a molding device for fabricating a lens, which is an embodiment of the present invention under the above-described conditions, are shown in FIGS. 7 through 9. FIG. 7 is a schematic view of a molding device including a piston 60 to be a driving portion. Although illustration is omitted, in actuality, these members (molding unit) charged with a glass raw material 16 are placed in a closed space with a nitrogen atmosphere, and a heater to control temperature is arranged so as to contact a base 50. FIG. 8 is an enlarged view of a center portion of the molding unit, and FIG. 9 shows a condition where a glass raw material has been press-fitted to the inner circumferential surface of a holder 20 after being molded into a lens 10.

As the procedures of a molding process, the lens holder 20 is inserted into the cylindrical inside of an inner sleeve 40 processed in a shape as shown in FIG. 7, for example, according to a structure of a lower die 34. The lower die 34 is inserted via the inner sleeve 40 into a through hole of this lens holder 20, and the globular glass raw material 16 is charged in a manner supported by the through hole and lower die.

As shown in FIG. 9, a step is provided in an inner hole of the inner sleeve 40 and by this step, a position S of the lens holder 20 with respect to the lower die 34 is determined. By this mechanical means, a relative position x of the lens and lens holder can be appropriately set.

In such a manner as to sandwich the lower die 34 adjusted as such and the glass raw material 16, an upper die 32 is inserted into an outer sleeve 46. The upper die 32 can be freely slid in the axis direction inside a cylindrical through hole of the outer sleeve 46.

These members whose assembly has been completed are fixed onto a stepped columnar supporting base called a base 50. Furthermore, on the base 50, as shown in, for example, FIG. 7, a metallic or ceramic cover 52 is installed. By these procedures, a molding unit including the molds and glass raw material is completed. By holding the base 50 so as to maintain the axis direction of the cover 52 in a vertical direction, the molding unit can be carried, and this can be carried in the molding device or taken out thereof.

The molding unit for which preparation has been finished is placed in a closed space filled with a nitrogen atmosphere, and is heated to reach a predetermined temperature by the heater on a surface in contact with the base. The predetermined temperature means a temperature at which the glass raw material can be softened to become a moldable condition without causing a fracture phenomenon such as cracks, and this is determined depending on characteristics of the glass raw material. This atmospheric temperature normally reaches around 400° C., and therefore, maintaining a nitrogen atmosphere is required to prevent oxidization of the molding unit.

In addition, owing to the high-temperature region as described above as well, a material which has a sufficient rigidity as a structural material and whose thermal expansion is relatively small is applied to the upper die 32 and lower die 34, and in addition, for the purpose of improving mold reliability of glass after molding, mold releasing films are applied to the front surfaces of upper and lower transfer surfaces 32a and 34a shown in FIG. 8. In an example, the upper die 32 and lower die 34 are fabricated by a super steel material represented by tungsten carbide, and for the mold releasing films, a tungsten (W)- or chrome (Cr)-based oxide or nitride material is mainly selected.

In the molding process, first, the glass raw material 16 in the molding unit is heated to reach a predetermined temperature range in a nitrogen atmosphere to sufficiently soften the same to become a condition causing no fracture phenomenon of the glass such as cracks. Next, as shown in FIG. 7, the upper die 32 is depressed in a direction shown by the arrow by use of the piston 60 for which pressure is appropriately controlled.

An end point of a molding operation by the upper die 32 is determined by a thickness Th of the lens designed to be optimized for desirable optical performance. Accordingly, although a method of controlling an operational end of the piston 60 by a computer or the like including an operation mode, in the present example, as shown in FIG. 7, a diameter of an upper portion of the piston 60 is made larger than a diameter of the cover 52, a point in time where the upper portion of the piston makes contact with the upper end face of the cover 52 is provided as a mechanical endpoint of the molding operation. Accordingly, by changing the overall height of the cover 52, a desirable lens thickness Th can be obtained. This method has such an advantage as being structurally simple and necessitating no complicated device control.

A condition where molding has reached an appropriate end point by the piston 60, the glass raw material has been molded by the transfer surfaces 32a and 34a of the upper and lower molds 32 and 34, and the externally expanded glass raw material has been press-fitted to the inner circumferential surface of the lens holder 20, whereby a final shape of the lens 10 has been obtained is shown in FIG. 9 by a schematic view. As mentioned above, by adjusting, in advance, the position S of the lens holder with respect to the lower die 34 by the step of the inside of the inner sleeve 40 in the molding unit, the relative position x in the axis direction of the lens and lens holder can also be appropriately secured.

Here, the shapes of the molding surfaces of the upper die 32 and lower die 34 are processed so that the designed lens surfaces 10a and 10b can be correctly transferred and are processed so that a plane part of the peripheral edge part 12 is formed outside these lens surfaces. Here, as shown in FIG. 9, gaps exist between the molding surfaces of the upper die 32 and lower die 34 and inner circumferential surface of the through hole of the lens holder 20 when molding is completed. Thereby, parts which do not contact the inner circumferential surface of the lens holder or molding surfaces of the upper and lower molds can be provided on the surfaces of the molded lens.

The molding unit including the lens 10 for which molding and press-fitting and integration with the lens holder have been finished is taken out of the molding device while a "pressing" condition of FIG. 9 is maintained, and is sufficiently cooled. Thereafter, the lens 10 integrated with the lens holder 20 is taken out of the molding unit, whereby an aspherical lens with a holder in a shape shown in FIG. 1 can be obtained.

The structure of the molding device is not limited to the above-described example. Generally speaking, by providing a mechanical means for maintaining the holder at a predetermined position with respect to either of the molds and also providing a mechanical means for determining the distance between both molds when pressing is finished at a predetermined value, a lens shape and a position of the lens in the optical axis direction within the lens holder can be determined with excellent reproducibility. By carrying out positioning by the mechanical means, it is made unnecessary to add a complicated means such as computer control to the molding device.

EXAMPLE 1

Hereinafter, a concrete example according to the present invention is shown. A lens shape is basically the same as that shown in FIG. 2 or FIGS. 3A and 3B, and this is fixed to a lens holder in a shape shown in FIG. 4. The lens shape and lens holder shape of the present example will be described in the following.

For the shape of an aspherical lens, a sag amount Z is expressed by a polynomial expression of a radial distance r from the lens center:

$$Z = Th + ar^2 + br^4 + cr^6 + dr^8, \text{ and}$$

aspherical coefficients a, b, c, and d are provided as values shown in Table 1.

In addition, dimensions and processing tolerances of respective portions of the lens holder are shown in Table 2.

As a glass raw material for the lens, glass whose linear expansion coefficient is $102 \times 10^{-7}/°$ C. is processed in a globular form and used. As a lens holder material, SF20T of ferritic stainless steel is used. Its linear expansion coefficient is $110 \times 10^{-7}/°$ C.

In order to fabricate a lens of the above-described specifications, the volume of the glass raw material to be charged is determined. Since De=Dea=1.54 mm, D=1.985 mm (considering the tolerance of the through hole inside diameter of the lens holder shown in Table 2), D−De=0.445 mm, which satisfies the condition of expression (1).

When these values are substituted for expression (4) and expression (5), two ranges of R can be obtained.

$0.1 \leq R \leq 0.239$ mm   By expression (4), $0.1 \leq R \leq 0.198$ mm   By expression (5), Of these, by selecting the narrower range, the range of R is determined as $0.1 \leq R \leq 0.198$ mm If the outer circumferential surface 12b of the edge of the lens and inner circumferential surface 24 of the lens holder are tightly fitted, volume Vk of an edge part can be expressed by D, A, and R as:

$$Vk \text{ (mm}^3) = 4\pi R^3/3 + 2\pi R\{(D-2R)/2\}^2 + \pi^2\{(D-2R)/2\}R^2 + \pi(D/2)^2(A-2R) \quad (6)$$

In the above-described range of R, when the volume Vk of the edge part within the tolerance range of Di is determined by use of the above-described expression (6), values shown in Table 3 can be obtained.

On the other hand, where volumes of lens parts 16a and 16b are provided as Va and Vb, the volume of the entire lens V is provided by the following expression:

$$V = Va + Vb + Vk \quad (7)$$

When the volumes Va and Vb of the lens surface parts 16a and 16b are calculated on the basis of a shape shown in Table 1, Va=0.315 mm³

Vb=0.063 mm³

As in the above, when the lens volume V is calculated by expression (7), values shown in Table 4 can be obtained. Thereby, with the inside diameter of the through hole Di=1.985 mm, the volume of the glass raw material is within a range of 2.530 to 2.604 mm³, and with Di=1.995 mm, in a range of 2.552 to 2.627 mm³. Accordingly, if a volume error as a result of a tolerance in the through hole inside diameter of a used lens holder is absorbed by a radius of curvature of the trims, it is sufficient to select an overlapping part of the above-described ranges, that is, a range of 2.55 to 2.60 mm³. An actual volume of the globular glass raw material can be simply determined by measuring its weight and dividing the same with specific gravity.

TABLE 1

|  |   | Lens surface 10a | Lens surface 10b |
|---|---|---|---|
| Lens thickness Th |   | 1.2 | |
| Aspherical coefficient | a | 0.6985 | −0.2857 |
|   | b | 0.0198 | 0.0374 |
|   | c | −0.2276 | −0.0935 |
|   | d | 0.3875 | −0.1185 |
| Effective diameter |   | Dea = 1.54 mm | Deb = 1.22 mm |

TABLE 1-continued

|  | Lens surface 10a | Lens surface 10b |
|---|---|---|
| Sag amount Z | Za = 0.366 mm | Zb = 0.106 mm |
| Edge thickness A | 0.728 mm | |

Note:
$Z = Th + ar^2 + br^4 + cr^6 + dr^8$

TABLE 2

| Unit: mm | Central value | Tolerance |
|---|---|---|
| Lens holder diameter Do | 3 | ±0.02 |
| Through hole inside diameter Di | 1.99 | ±0.005 |
| Through hole length h | 0.75 | ±0.1 |
| Lens holder length H | 1.3 | ±0.05 |

TABLE 3

|  |  | Through hole inside diameter Di (mm) | |
|---|---|---|---|
| Edge part volume Vk (mm³) |  | 1.985 | 1.995 |
| Trimming radius of curvature R (mm) | 0.100 | 2.226 | 2.249 |
|  | 0.198 | 2.215 | 2.174 |

TABLE 4

|  |  | Through hole inside diameter Di (mm) | |
|---|---|---|---|
| Edge part volume (mm³) |  | 1.985 | 1.995 |
| Trimming radius of curvature (mm) | 0.100 | 2.604 | 2.627 |
|  | 0.198 | 2.530 | 2.552 |

EXAMPLE 2

Figure 10:
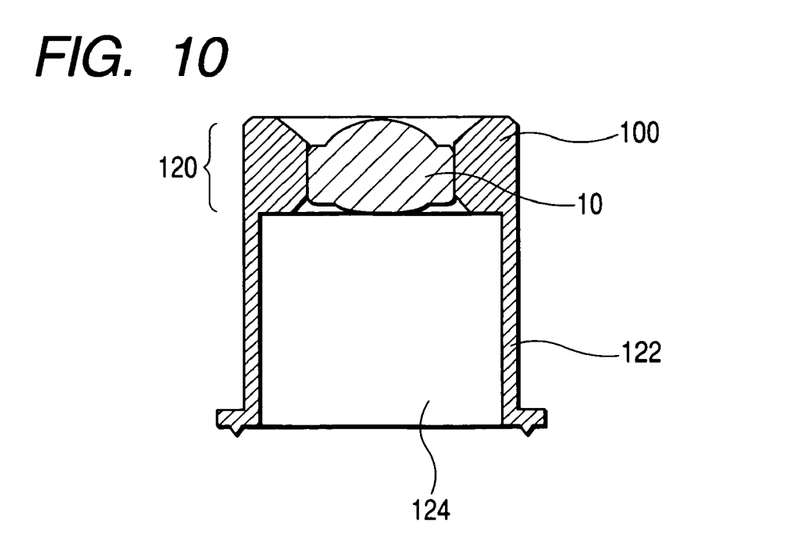
FIG. 10 is a sectional view of a molded lens with a lens holder for a semiconductor optical element.

In the present example, such an optical component as shown in FIG. 10 wherein a lens 10 having basically the same shape as that of the above-described example 1 has been fixed to a holder 100 was fabricated. Although a lens holder part 120 to which the lens 10 has been fixed has the same structure as that of Example 1, this holder 100 is different in having, at its lower portion, a cylindrical part 122 with a large inside diameter.

Figure 11:
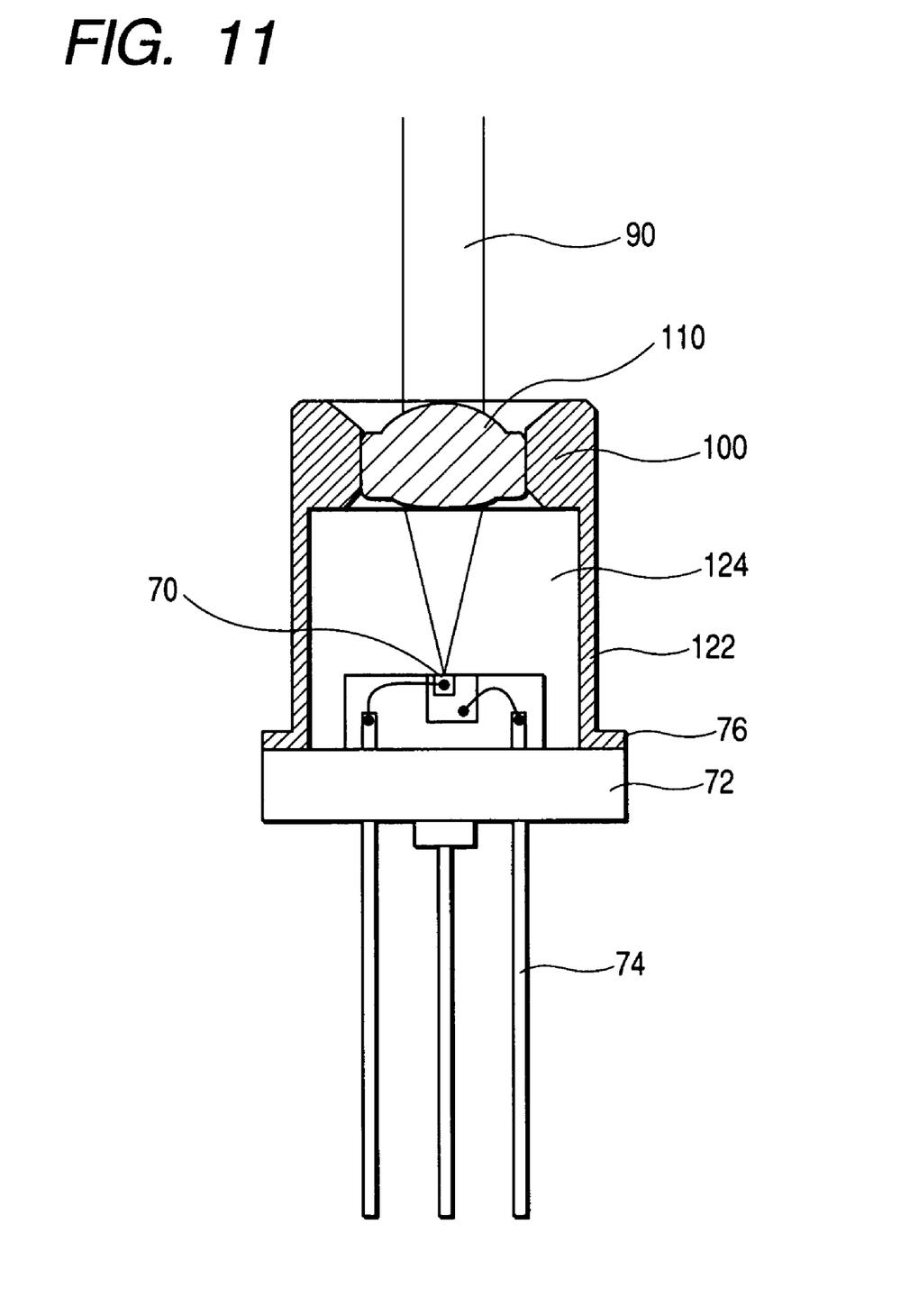
FIG. 11 is a sectional view of a semiconductor optical element with a collimate lens.
Figure 12:
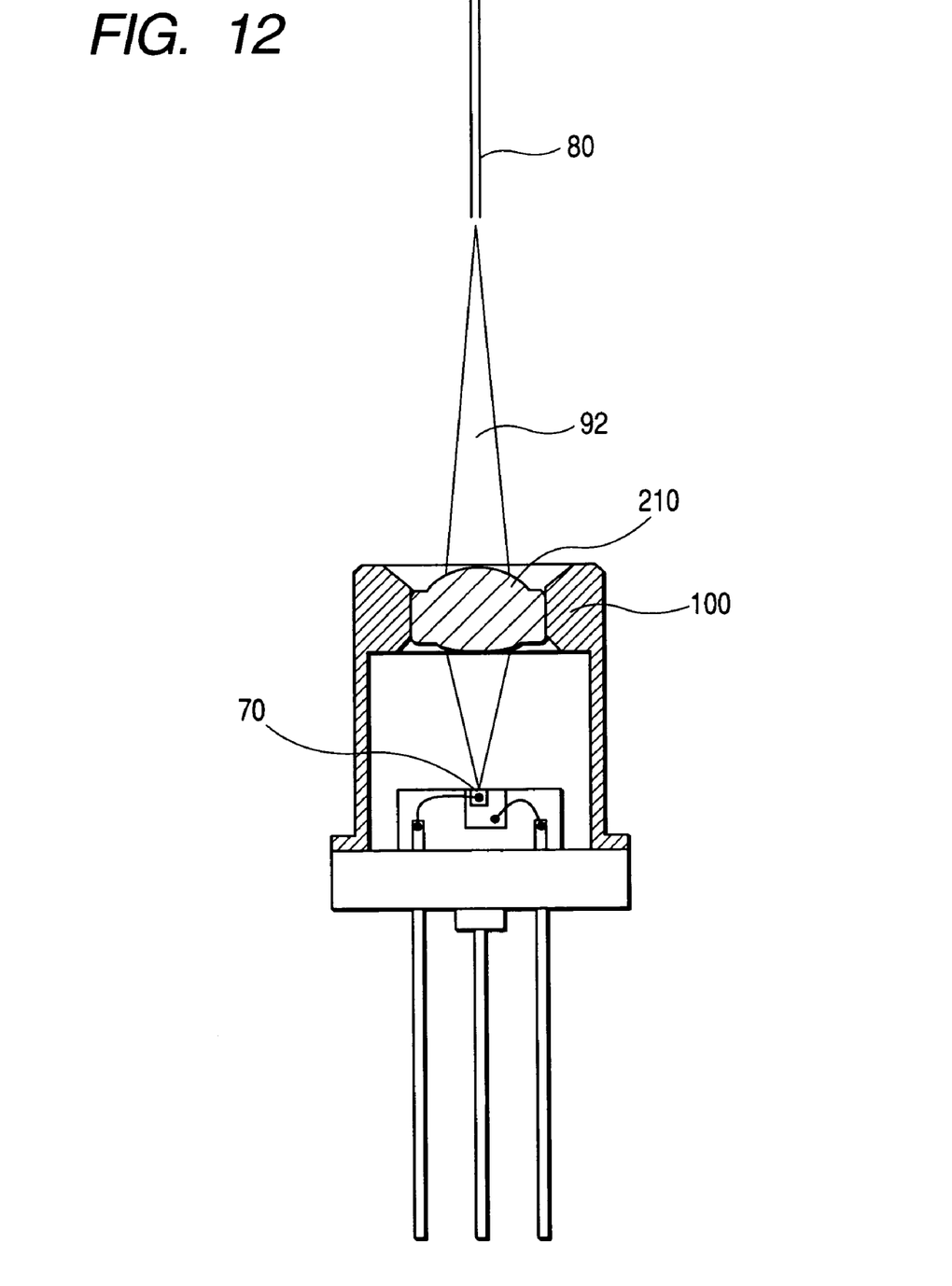
FIG. 12 is a sectional view of a semiconductor optical element with a condenser lens.

By designing and fabricating such an optical component, as shown in FIG. 11 or FIG. 12, an optical element wherein a semiconductor laser chip 70 and a lens has been integrated can be provided. The chip 70 is bonded onto a base 72, and electrodes and lead wires 74 on the chip are connected. On the surface of this base 72, a straight cylindrical part 122 of the lens holder to which a lens has been fixed as shown FIG. 10 is covered, and a contact point thereof 76 is airtightly sealed by welding or the like. Prior thereto, an inactive gas such as He is filled in a hollow part 124, which is inside the cylindrical part. Since a lens 110 of FIG. 11 has been designed as a lens with an infinite conjugate ratio so as to collimate light emitted from a semiconductor laser, light taken out of the lens 110 becomes a parallel beam 90.

In the example of FIG. 12, a lens 210 has been designed as a lens with a unit conjugate ratio so as to condense light emitted from a semiconductor laser. In this case, a converging light beam 92 can be coupled to an optical fiber 30, for example.

In addition, the chip 70 is not limited to a semiconductor laser and may be another light-emitting element, for example, a light-emitting diode, a super luminescent diode, or the like. In addition, it may be a light-receiving element. In a case of a light-receiving element, a parallel light from the outside can be condensed onto the light-receiving chip, or a divergent light emitted from an optical fiber can be condensed onto the light-receiving chip. In addition, with an element whose light-receiving area is wide, a collimated light may be made incident.

Here, as described above, normally, an inactive gas is to be filled inside the hollow part 124, and this is carried out for the purpose of protecting the internal light-emitting/light-receiving chip from the external environment and preventing oxidization. In terms of the optical component by the present invention, since a lens has been press-fitted and integrated without exerting an excessive pressure on the inner circumferential surface of a lens holder, airtightness is excellent, and by securely airtightly sealing the cylindrical part 122 of the lens holder and base 72, it is possible to easily realize a condition where the light-emitting/light-receiving chip has been completely isolated from the external environment.

Although, in the above-described embodiments and examples, an optical component wherein an aspherical convex lens and a lens holder has been integrated has been described for example, the present invention is not limited thereto. The lens may be a spherical lens and may be either a convex lens or a concave lens. In addition, it maybe a diffractive optical element such as a Fresnel lens. In addition, the present invention can be broadly applied to various types of optical components wherein, in addition to lenses, various types of optical elements which can be formed by molding, such as curved reflecting mirrors and prisms are used while fixing the same to holders.

What is claimed is:

1. An optical component comprising:
   an optical element provided by molding a glass, including an effective part providing an optical function and a peripheral edge part protruding to surround the effective part;
   a holder having a through hole to which the optical element is fixed,
   wherein an inner surface of the through hole forms a straight cylindrical shape, and an outer circumference of the peripheral edge part is tightly fitted to the inner surface around an entire circumference of the inner surface.

2. The optical component according to claim 1, wherein a sectional shape of the effective part and a sectional shape of the outer circumference of the peripheral edge part are circular in a direction perpendicular to an optical axis of the optical element, and
   a difference between a diameter De of the sectional shape of the effective part and a diameter D of the sectional shape of the outer circumference of the peripheral edge part is set to be 0.3 mm or more.

3. The optical component according to claim 2, wherein a ratio A/D of a thickness A of the peripheral edge part in a direction of the optical axis to the diameter D of the outer circumference of the peripheral edge part is 0.25 or more, and
   a ratio A/Th of the thickness A to a maximum thickness Th of the optical element is 0.5 or more.

4. The optical component according to claim 3, wherein the peripheral edge part includes surfaces perpendicular to the optical axis and an outer circumferential surface parallel to the optical axis,
   a corner portion at which one of the surfaces perpendicular to the optical axis is intersected with the outer circumferential surface is rounded with a radius of curvature R, and
   the radius of curvature R is in a range of $0.1 \leq R \leq (A-0.25)/2$ Where the unit of R and A is mm.

5. The optical component according to claim 3, wherein the peripheral edge part has surfaces perpendicular to the optical axis and an outer circumferential surface parallel to the optical axis,
   a corner portion at which one of the surfaces is intersected with the outer circumferential surface is rounded with a radius of curvature R, and
   the radius of curvature R is in a range of $0.1 \leq R \leq (D-De)/2 - 0.025$ based on a diameter De of the effective part of the optical element and the diameter D of the outer circumference of the peripheral edge part,
   Where the unit of R, D and De is mm.

6. The optical component according to claim 1, wherein a linear expansion coefficient of the holder is greater than a linear expansion coefficient of a glass raw material for molding the optical element, and a different therebetween is $20 \times 10^{-7}/°$ C. or less.

7. The optical component according to claim 1, wherein the optical element includes a lens.

8. The optical component according to claim 7, wherein the lens is an aspherical convex lens.

9. The optical component according to claim 7, wherein a cylindrical part in which a semiconductor optical element is inserted and fixed is provided so as to be coupled the through hole of the holder to which the lens is fixed,
   the semiconductor optical element is airtightly sealed in the cylindrical part, and
   a distance between the lens and the semiconductor optical element is determined so that light emitted by the semiconductor optical element is condensed or collimated or so that light received by the semiconductor optical element is condensed or collimated.

10. A method for manufacturing an optical component with a holder comprising the steps of:
    inserting a pair of molds into the holder in which a through hole having a straight cylindrical part is formed at least partly so as to be opposed to each other from opposite sides of the through hole, and
    press-molding a glass raw material in a formed space to thereby form an optical element including an effective part having an optical function and a peripheral edge part protruding to surround the effective part,
    wherein an outer circumference of the peripheral edge part is tightly fitted to an inner surface of the cylindrical part of the through hole of the holder through the entire of a circumference of the inner surface.

11. The method for manufacturing an optical component according to claim 10, wherein a molding surface formed by the molds is provided with such a shape that a part of the peripheral edge part does not contact with the holder and the molds when a press-molding is finished, and
    the shape of the part of the peripheral edge part which does not contact with the holder and the molds is changed within a predetermined range in accordance with a variation in an inside diameter of the cylindrical part, so that a volume of a charging glass raw material is maintained at a constant amount.

12. The method for manufacturing an optical component according to claim 11, wherein
the part of the peripheral edge part which do not contact with the holder and the molds is rounded at a corner portion at which one of surfaces perpendicular to the optical axis and an outer circumferential surface parallel to the optical axis are intersected, and a radius of curvature thereof is changed.

13. The method for manufacturing an optical component according to claim 10, wherein the holder is maintained at a predetermined position with respect to either of the molds by a first mechanical means, and a distance between both molds when pressing is finished is determined at a predetermined value by a second mechanical means.

* * * * *